United States Patent [19]

De Schrijver et al.

[11] 3,807,999
[45] Apr. 30, 1974

[54] PHOTO-CYCLOADDITION POLYMERIZATION OF BIS-ANTHRACENES

[75] Inventors: Frans Carolus De Schrijver, Leuven; Gerard Albert Delzenne, Gravenwezel, both of Belgium

[73] Assignee: AGFA-Gevaert N.V., Mortsel, Belgium

[22] Filed: Mar. 9, 1972

[21] Appl. No.: 233,325

[30] Foreign Application Priority Data
Mar. 19, 1971   Great Britain...................... 7376/71

[52] U.S. Cl.................... 96/27 F, 96/35.1, 96/45.1, 96/115, 204/159.22, 250/316, 250/317
[51] Int. Cl................................................ G03c 1/68
[58] Field of Search.......... 96/35.1, 45.1, 27 F, 115; 250/316, 317; 204/159.22

[56] References Cited
UNITED STATES PATENTS
2,980,535   4/1961   Schroeter............................ 96/35.1
3,622,321   11/1971   Smets et al. ........................ 96/35.1

*Primary Examiner*—Ronald H. Smith
*Attorney, Agent, or Firm*—A. W. Breiner

[57] ABSTRACT

Bis-anthracenes corresponding to one of the formulae:

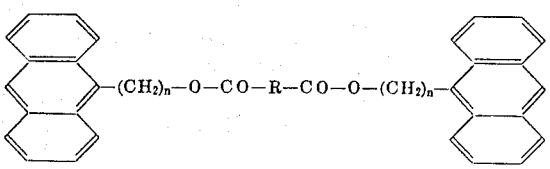

and

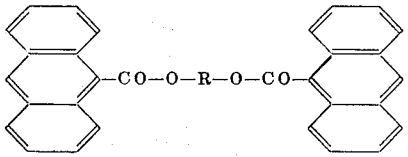

wherein R represents an alkylene group of two to 10 carbon atoms and $n$ is 1 or 2,
are photo-cycloaddition polymerized by exposing to ultraviolet radiation at 365 nm in the absence of oxygen.

The polymers formed can be degraded by exposing to a heat treatment, or by irradiation at 254 nm. The degraded polymers can be repolymerized upon ultraviolet irradiation at about 365 nm in the absence of oxygen.

A method of recording information is described, by using the photo-cycloaddition polymerization with ultraviolet light, and the degradation by exposing to heat or to radiation at 254 nm.

9 Claims, No Drawings

PHOTO-CYCLOADDITION POLYMERIZATION OF BIS-ANTHRACENES

The invention relates to the photo-cycloaddition polymerization of bis-anthracenes.

It is known that anthracene and its derivatives substituted at the 9-position can be dimerized in the presence of light. Bis-anthracenes also have been prepared but they were studied to determine the nature of intramolecular reactions between the two anthracene groups present in the same molecule.

It has been found now that some bis-anthracenes form polymers by a photocycloaddition reaction, and that these polymers have very special and useful properties.

According to the invention a process is provided for the photo-cycloaddition polymerization of bis-anthracenes, which process comprises exposing to ultraviolet radiation, in the absence of oxygen, bis-anthracenes corresponding to one of the general formulae:

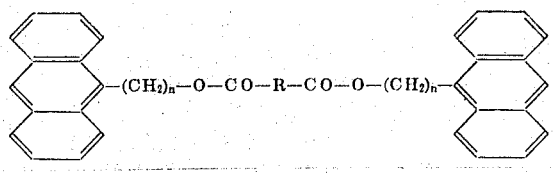

and

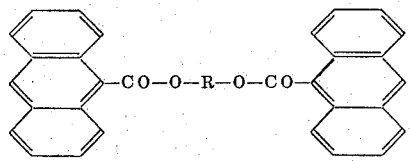

wherein R represents an alkylene group of two to 10 carbon atoms and $n$ is 1 or 2.

Most conveniently the irradiation of the bis-anthracenes with ultraviolet radiation occurs in solution in halogenated alkanes such as dichloromethane, after removal of all oxygen from the solution by bubbling an inert gas, such as dry oxygen-free argon therethrough. The bis-anthracenes may also be irradiated in the solid state, preferably in the form of a thin coating applied from solution to any support, such as paper, naturally also in the absence of oxygen.

The irradiation with ultraviolet radiation should be performed in the absence of oxygen, since oxygen acts as an inhibitor for the photo-cycloaddition polymerization reaction. It has been observed that this polymerization reaction is reversible. Indeed, when the polymers are exposed to a heat treatment, they are degraded, which results in the formation of anthracene end groups. The same effect can be obtained by irradiation at 254 nm. The degraded polymers can be repolymerized by exposing them again to ultraviolet radiation at about 365 nm in the absence of oxygen.

By infrared spectroscopy it could be proved that the most probable structure of the polymerization products is a head-to-tail arrangement wherein two anthracene units are joined at the respective 9, 10 positions. Upon heating above the melting point these bonds are destroyed and the original bis-anthracenes are restored.

Most of the polymers are soluble in haloalkanes such as dichloromethane and chloroform. In some cases they become insoluble in these solvents as a result of crystallization. In these cases the polymers were found to be soluble in dimethylsulphoxide, thus proving that no cross-linked structures were formed.

The photo-cycloaddition polymers can be formed from solutions into transparent films, which are more brittle when the number of $-CH_2-$ groups forming the alkylene group between two anthracene ester groups is small.

During the photo-cycloaddition polymerization reaction some fluorescence of the products can be noted. The absence of fluorescence before polymerization is probably due to concentration quenching. Heating of the films or their exposure to ultraviolet radiation of 254 nm results in a rupture of the anthracene bridges between the monomer units. So, two free anthracene end groups are formed which stand in a favourable position to cause excimer fluorescence. This excimer-fluorescence is bathochrome with respect to the fluorescence anthracene.

The polymer chains can be reformed on exposure with ultraviolet radiation of 365 nm or higher intensities, naturally in the absence of oxygen. By a Diels-Alder reaction of maleic anhydride with the anthracene end groups of the original polymer the fluorescence of these end groups, which could have a disturbing influence during the process, can be fully eliminated.

The occurrence of excimer fluorescence can be used as a very interesting photographic procedure. Indeed, when the polymers obtained by the photo-cycloaddition polymerization of the bis-anthracenes are applied as a layer to a support, this layer can be image-wise exposed to heat, e.g. by means of an infrared laser, so that the bonds between two anthracene groups are destroyed in the exposed places. The image thus formed into the layer can be scanned with an ultraviolet laser and recorded with a photocell sensitive to the excimer-fluorescence occurring in those places where the polymer has been destroyed by the infrared laser.

For the preparation of the bis(9-anthrylalkyl)-esters of alkane dicarboxylic acids, 9-anthraldehyde is made to react in a methanol medium with sodium borohydride, and the 9-hydroxyalkylanthracene formed is converted with a diacid chloride such as succinoyl chloride, adipoyl chloride pimeloyl chloride, suberoyl chloride azeloyl chloride and sebacoyl chloride.

In the case of alkylene diesters of 9-anthroic acid the 9-anthroic acid is converted with thionyl chloride into 9-anthroyl chloride, which upon reaction with a dihydroxyalkylene forms the alkylene diester of 9-anthroic acid. All these reactions are described in the following preparations.

PREPARATION 1

Bis(9-anthrylmethyl)-ester of Sebacic Acid

A solution of 3 g of sodium borohydride in 30 ml of water and 150 ml of methanol were slowly added to a refluxing solution of 30 g of 9-anthraldehyde in 750 ml of methanol. The addition was stopped when the bright yellow colour of 9-anthraldehyde had faded to a light yellow colour. Heating was stopped and 750 ml of distilled water of 10°C were added. The precipitated solid was filtered, redissolved in aqueous methanol, and crystallized.

9-hydroxymethyl-anthracene having a melting point of 152°–158°C was obtained.

In a three-necked flask equipped with a thermometer, a condenser provided with a calcium chloride tube, a dropping funnel, and a magnetic stirrer were placed 100 ml of benzene, 2.1 g of 9-hydroxymethylanthracene, and 0.79 g of pyridine. To this mixture were added dropwise while stirring at 40°–60°C 1.2 g of sebacoyl chloride with 20 ml of benzene. After complete addition the mixture was stirred for further 4 hours, whereafter the reaction product was evaporated to dryness, redissolved in methylene chloride and filtered. About 10 percent by volume of ethanol calculated on the volume of methylene chloride was added and the mixture was cooled to allow the product to crystallize.

Melting point: 119.5°–121°C.

PREPARATION 2

Bis(9-anthrylmethyl)-ester of Azelaic Acid

This product was prepared in the same way as described in preparation 1, but 9-hydroxymethyl-anthracene and azeloyl chloride were used instead.

Melting point: 131°–132°C.

PREPARATION 3

Bis(9-anthrylmethyl)-ester of Suberic Acid

This product was prepared in the same way as described in preparation 1, but 9-hydroxymethyl-anthracene and suberoyl chloride were used instead.

Melting point: 127°–127.5°C.

PREPARATION 4

Bis(9-anthrylmethyl)-ester of Pimelic Acid

This product was prepared in the same way as described in preparation 1, but 9-hydroxymethyl-anthracene and pimeloyl chloride were used instead. The product was recrystallized from a mixture of benzene and methanol.

Melting point: 152°–156°C.

PREPARATION 5

Bis(9-anthrylmethyl)-ester of Adipic Acid

This product was prepared in the same way as in preparation 1, but 9-hydroxymethyl-anthracene and adipoyl chloride were used instead.

Melting point: 184.5°–186°C.

PREPARATION 6

Bis(9-anthrylmethyl)-ester of Succinic Acid

This product was prepared in the same way as in preparation 1, but 9-hydroxymethyl-anthracene and succinoyl chloride were used instead.

Melting point: 190°–192°C.

PREPARATION 7

Decamethylene Diester of 9-Anthroic Acid 13.2 g 9-anthroic acid were dissolved in 300 ml of dry benzene and 5.8 g of thionyl chloride were added. The mixture was refluxed for 4 hours, whereafter the solvent was evaporated in vacuo.

5.76 g of the 9-anthroyl chloride thus formed were dissolved in 250 ml of benzene and 2.08 g of 1,10-decanediol were added in 2.5 ml of pyridine. The reaction mixture was refluxed for 6 hours at 78°C. whereafter the precipitate was isolated. The filtrate was evaporated to dryness so that a brown oil formed that was dissolved in chloroform. The product was purified with an $Al_2O_3$ column and recrystallized from methylene chloride and methanol.

Yield: 5.8 g.

Melting point: 128.8°–129.8°C.

PREPARATION 8

Hexamethylene Diester of 9-Anthroic Acid 2.4 g 9-anthroyl chloride were dissolved in 100 ml of benzene and heated for 6 hours at 78°C with 0.59 g of 1,6-hexanediol and 0.79 g of pyridine. The solid matter was isolated and the solvent was evaporated in vacuo. The product was purified as described in preparation 7, but from a chloroform solution.

Yield: 2.2 g.

Melting point: 151°–152°C.

EXAMPLES 1 TO 5

The bis(9-anthrylmethyl)-esters of aliphatic dicarboxylic acids obtained according to Preparations 1 to 5, were dissolved in flasks of boron-silicate glass and oxygen-free argon was bubbled through for 30 minutes, whereafter the flasks were sealed to exclude any oxygen. The solutions were then irradiated in a photochemical reactor fitted with a lamp emitting at 3500 A. The temperature varied between 30°C and 40°C. After irradiation the solution was filtered and poured in excess (5 times) acetone. The precipitated polymer was filtered and dried in vacuo of 1 mm Hg at 40°C. Whenever the polymer became insoluble during irradiation, the solid was recovered after filtration from the dichloromethane solution and dried also after washing with acetone to remove all monomer.

The results are given in the following table.

| Example | Di-ester from preparation no. | Concentration during irradiation in moles/litre | Irradiation time in hours | Molecular weight | Melting range in °C |
|---------|-------------------------------|------------------------------------------------|--------------------------|------------------|---------------------|
| 1 | 4 | 0.1 | 69 | 6800 | 210–220 |
| 2 | 5 | 0.2 | 48 | 5435 | 187–217 |
| 3 | 6 | 0.2 | 48 | 4560 | 197–202 |
| 4 | 7 | 0.2 | 48 | 12000 | 200–208 |
| 5 | 8 | 0.2 | 48 | 11600 | 197–212 |

The molecular weight was determined in a laboratory vapour pressure osmometer in chloroform solution. The melting range was determined in a differential scanning colorimeter under nitrogen atmosphere with a heating ratio of 8°C/minute.

The photo-cycloaddition polymers were characterized by elemental analysis, infrared spectrometry, molecular weights and thermal properties.

Most of the polymers were soluble in dichloromethane and chloroform. In some cases they became insoluble in these solvents as a result of crystallization, but in these cases they were found to be soluble in dimethyl sulphoxide.

When comparing the infrared spectra of the monomers and the polymers with those of anthracene and its dimer it was found that changes occurring in infrared on dimerization of anthracene were manifesting themselves also when a change from monomer into polymer occurred, except for the fact that in the case of polymers the spectra show large bands characteristic of polymers. Especially the sharp band at 1620 cm$^{-1}$ that is characteristic of the anthracene type structure, is missing in the dimer as well as in the polymers. This is also the case at 880 cm$^{-1}$. A single band at 1450 cm$^{-1}$ is changed into two bands at 1450 and 1470 cm$^{-1}$. New bands appear near 680 cm$^{-1}$ and in the range of 3000–3100 cm$^{-1}$.

Also the fact that polymers can be converted back into monomers by heating above their melting points, offered strong support to the hypothesis of the photo-cycloaddition polymerization of bis-anthracene esters involving a reaction analogous to the dimerization of anthracene where two anthracene units are joined together at the respective 9, 10 positions.

Elemental analysis of the polymers showed that simple polyaddition products were obtained, except in some cases wherein a slight difference from the calculated values was found. This could be attributed to a slight oxidation of the anthracene groups, probably due to the presence of some residual oxygen remaining in the solution in spite of bubbling argon therethrough.

In all cases the polymers were found to decompose above their melting range. Since the polymers are decomposed to monomers by heating and can be repolymerized when exposed to ultraviolet radiation, the possibility exists of repeatedly polymerizing the monomer with ultraviolet radiation in the absence of oxygen and of depolymerizing thermally.

The polymers form transparent films when applied from solution to a support, which films are more brittle when the number of carbon atoms between the anthryl-methyl ester groups is small.

EXAMPLE 6

Decamethylene diester of 9-anthroic acid of preparation 7 was dissolved in dichloromethane in tubes of boron-silicate glass to a concentration of 0.2 mole/litre. The solution was freed from oxygen by bubbling argon through it for 30 minutes. Photopolymerization occurred by exposure for 48 hours to light having a maximum of intensity at 366 nm. It formed was separated by adding an excess of acetone whereafter the polymer was filtered and dried in vacuo at 40°C. The polymer had an intrinsic viscosity of 0.65 which corresponds with a molecular weight of 21,000.

EXAMPLE 7

The process of Example 6 was repeated with hexamethylene diester of 9-anthroic acid. The polymer formed upon exposure to ultraviolet radiation was insoluble in dichloromethane and precipitated.

EXAMPLE 8

250 mg of poly(decamethylene diester of 9-anthroic acid) according to Example 6 were dissolved in 10 ml of chloroform and the solution formed was applied to a polyethylene terephthalate support. The thickness of the layer before drying was approximatively 0.125 mm. The layer could also be applied to a glass support or a quartz plate.

After drying the layer was heated for 60 seconds at 155°–160°C. When the heated layer was exposed to ultraviolet radiation of 365 nm, fluorescent radiation having a maximum at 448 nm was observed. The intensity of the fluorescence increased with the time of heating. When the layer was heated image-wise, e.g. with a $CO_2$-laser, a corresponding fluorescent image was formed.

The same effect could be obtained when, instead of heating, the polymer layer was exposed to radiation of 254 nm. This exposure could also be performed image-wise by irradiating the layer through a transparent original with a low-pressure mercury vapour lamp, or by scanning the image with a Nd-laser or a He—Cd—laser.

We claim:

1. Method of recording information, comprising information-wise exposing to heat or ultraviolet radiation of 254 nm a recording material comprising a support and a layer of photo-cycloaddition polymer of bis-anthracene, whereby said photo-cycloaddition polymer layer is information-wise degraded and a fluorescence pattern corresponding to said information-wise exposure is obtained, said photo-cycloaddition polymer of bisanthracene being obtained by exposing to ultraviolet radiation, in the absence of oxygen, bis-anthracene corresponding to one of the formulae:

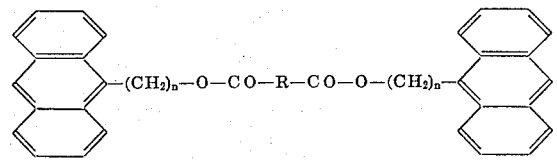

and

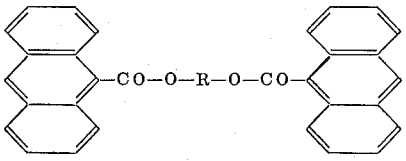

wherein R represents an alkylene group of from two to 10 carbon atoms and $n$ is 1 or 2.

2. The method of claim 1 wherein the bis-anthracene is bis(9-anthrylmethyl)-ester of sebacic acid.

3. The method of claim 1 wherein the bis-anthracene is bis(9-anthrylmethyl)-ester of azelaic acid.

4. The method of claim 1 wherein the bis-anthracene is bis(9-anthrylmethyl)-ester of suberic acid.

5. The method of claim 1 wherein the bis-anthracene is bis(9-anthrylmethyl)-ester of pimelic acid.

6. The method of claim 1 wherein the bis-anthracene is bis(9-anthrylmethyl)-ester of adipic acid.

7. The method of claim 1 wherein the bis-anthracene is bis(9-anthrylmethyl)-ester of succinic acid.

8. The method of claim 1 wherein the bis-anthracene is decamethylene diester of 9-anthroic acid.

9. The method of claim 1 wherein the bis-anthracene is hexamethylene diester of 9-anthroic acid.

* * * * *